(12) United States Patent
Yamaguchi

(10) Patent No.: US 6,906,321 B2
(45) Date of Patent: Jun. 14, 2005

(54) TIME-OF-FLIGHT MASS SPECTROMETER

(75) Inventor: Shinichi Yamaguchi, Kyoto-fu (JP)

(73) Assignee: Shimadzu Corporation, Kyoto (JP)

(*) Notice: Subject to any disclaimer, the term of this patent is extended or adjusted under 35 U.S.C. 154(b) by 0 days.

(21) Appl. No.: 10/896,064

(22) Filed: Jul. 22, 2004

(65) Prior Publication Data

US 2005/0017169 A1 Jan. 27, 2005

(30) Foreign Application Priority Data

Jul. 25, 2003 (JP) ....................................... 2003-280010

(51) Int. Cl.[7] .......................... H01J 49/00; H01J 49/40; G01N 27/62

(52) U.S. Cl. ....................... 250/287; 250/281; 250/282; 250/286; 250/288; 250/291; 250/292; 250/294; 250/295; 250/296; 250/298; 250/299; 250/300

(58) Field of Search ................................ 250/291, 292, 250/287, 288, 281, 282, 286, 294–296, 298–300

(56) References Cited

U.S. PATENT DOCUMENTS 6,794,641 B2 * 9/2004 Bateman et al. ............ 250/281
2004/0026613 A1 * 2/2004 Bateman et al. ............ 250/281
2005/0017169 A1 * 1/2005 Yamaguchi ................. 250/288

FOREIGN PATENT DOCUMENTS

JP 11-135060 5/1999

* cited by examiner

*Primary Examiner*—John R. Lee
*Assistant Examiner*—Bernard E. Souw
(74) *Attorney, Agent, or Firm*—Westerman, Hattori, Daniels & Adrian, LLP

(57) ABSTRACT

In a TOF-MS according to the present invention, ions fly a round orbit or a reciprocal path once or more than once to be separated by their mass to charge ratios before they are detected by a detector, The detector is movable at least in two positions, where the effective distances from the exit of the round orbit or the reciprocal path to the detector are different. The length of time of flight of ions in each position of detector is measured, and the mass to charge ratio of an ion is calculated based on the difference of the lengths of time of flight in at least two positions. Similarly, the ion source may be movable at least in two positions, and a similar method can be used to calculate or estimate the mass to charge ratio of ions.

22 Claims, 8 Drawing Sheets

Fig. 7A
Fig. 7B
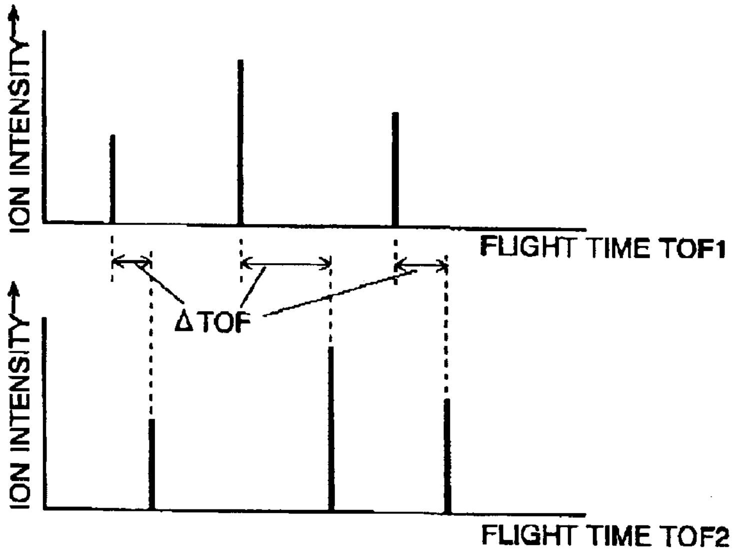
Fig. 8
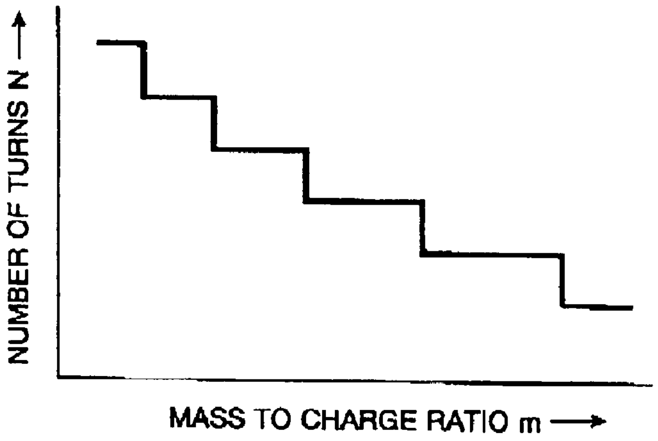

TIME-OF-FLIGHT MASS SPECTROMETER

The present invention relates to a time-of-flight mass spectrometer (TOF-MS), especially to one in which ions run almost the same path or orbit in a flight space more than once.

BACKGROUND OF THE INVENTION

In a TOF-MS, generally, ions accelerated by an electric field of a preset strength are thrown into a flight space where no electric field and no magnetic field is present. Since the initial speed of the ions and the time of flight in the flight space depends on the mass to charge ratio of the ions, the ions are separated by the mass to charge ratio until they are detected by an ion detector placed at the other end of the flight space. The difference in the time of flight (flight time) of two ions having different mass to charge ratios is larger as the flight path is longer. Thus, in order to enhance the resolution of a TOF-MS, it is better to obtain a longer flight path of ions. Due to the restriction to the overall length of the device, it is generally difficult to hold a long straight flight path Thus there have been proposed various types of TOF-MS that include effectively long flight paths.

In the Japanese Patent Application Publication No. H11-135060, a dual-circle closed orbit of the letter "8" is used for the flight path, and the ions run the orbit many times to attain an effectively long flight path.

There is a problem in the method, As shown in FIG. 15, in which the 8-shaped orbit of the above TOF-MS is depicted as a simplified form of a single circular orbit, ions ejected from the ion source 1 are introduced into the flight space 2 through the gate electrode 4 and are led to the circular orbit A. Note that structures and elements necessary to lead ions to the circular orbit are not shown in FIG. 15. After running on the circular orbit A one turn or more than one turn, ions leave the orbit A and the flight space 2, and are detected by the detector 3. Since the effective length of the flight path of ions becomes longer as the number of turns on the circular orbit A is increased, the difference in the flight time of ions slightly different in their mass to charge ratios becomes larger, so that they can be separated easier The system has a drawback as follows Ions of smaller mass to charge ratios run faster on the circular orbit A, so that they can catch up to slower ions having larger mass to charge ratios after turning a plurality of times, and both ions may leave the orbit A and enter the detector 3 almost at the same time. This catch-up happens not only in such a round orbit but also in a linear reciprocal or in a curved reciprocal path.

It means that, in the above structure, ions having close mass to charge ratios can be easily separated, but ions having a large mass to charge ratio difference cannot be separated when faster ions catch up to slower ions. In order to avoid the problem, conventional TOF-MSs restricted the mass to charge ratio of ions entering through the gate electrode 4 in the circular orbit A so that such a catch-up was prevented and Ions of a large mass to charge ratio difference could not be detected at the same time.

In this case, however, when ions of a wide mass to charge ratio range were intended to be measured, the wide range had to be divided into some narrower ranges, and measurements had to be repeated for those narrower ranges. Such repetitions of measurements are of course inefficient, and are sometimes impossible when the amount of available samples is very small.

SUMMARY OF THE INVENTION

An object of the present invention is therefore to provide a TOF-MS that can perform an analysis of ions of a wide range of mass to charge ratios efficiently. Another object of the present invention is to cover the wide range of mass to charge ratios with a small number of measurements, so that a sample of a small amount can be measured in a wide range of mass to charge ratios.

According to the fist mode of the present invention, a TOF-MS in which ions fly a round orbit or a reciprocal path once or more than once to be separated by their mass to charge ratios before they are detected by a detector, includes:

a device for measuring the lengths of time of flight of ions in at least two states in which an effective distance from an exit of the round orbit or the reciprocal path to the detector is different; and a data processor for calculating or estimating a mass to charge ratio of an ion based on a difference of the lengths of time of flight of ions of the same mass to charge ratio.

The speed of ions running on a round orbit or on a reciprocal path depends on the mass to charge ratio of the ions. The difference of the time of flight of the same ion between two states where the effective distances from the exit of the round orbit or the reciprocal path to the detector are different depends on the speed of the ion, and thus on the mass to charge ratio of the ion Therefore by measuring the lengths of the time of flight of the same ion in the two states, the mass to charge ratio of the ion can be calculated from the difference between the lengths of the time of flight in the two states.

Practically it is difficult to hold a large flight distance due to restriction from the overall size of the TOF-MS apparatus, and to calculate a precise mass to charge ratio of an ion from the difference of the flight time. But, the mass to charge ratio of ions in a range where the difference of the flight time is within a turn of a round orbit or within a round-trip of a reciprocal path can be precisely determined from the flight time of one of the states. Thus in the above process, it is enough to separate or discriminate between two sets of ions where the mass to charge ratio difference is larger than the value corresponding to a turn of the round orbit or a round-trip of the reciprocal path. This is possible even when the difference of the effective distances is small The ions are fist separated in groups where each group corresponds to the mass to charge ratios within a turn of a round orbit or a round-trip of the reciprocal path, and then precise mass to charge ratios of ions are calculated from their flight time within each group.

In one type of the TOF-MS according to the first mode of the present invention, the at least two states are realized by changing the position of a detector. In this type it is necessary to move a detector or necessary to provide a device to move a detector, but it has an advantage that a single sensor suffices.

In another type of the TOF-MS according to the first mode of the present invention, the at least two states are realized by providing separate detectors. By selecting one of the detectors, the effective distance from the exit of the round orbit or the reciprocal path to the detector can be changed. In this type, it is not necessary to move detectors nor to provide a device to move detectors, though more than one detector is necessary.

Another type of the TOF-MS according to the first mode of the present invention that requires only one detector is that ion reflecting electrodes are provided, and the voltage applied to the reflecting electrodes is changed whereby the effective distance from the exit of the round orbit or the reciprocal path to the detector can be changed.

Still another type of the TOF-MS according to the first mode of the present invention uses an electrostatic analyzer for deflecting a course of ions after leaving the round orbit or the reciprocal path and before entering the detector. In this case, the at least two states are realized by changing a voltage applied to the electrostatic analyzer.

In the first mode of the present invention described above, at least two states are provided relating to the path between the exit of the round orbit or the reciprocal path and the detector. Similar method can be used in relation to the path between the ion source and the entrance of the round orbit or the reciprocal path.

Thus in the second mode of the present invention, a TOF-MS in which ions generated by an ion source fly a round orbit or a reciprocal path once or more than once to be separated by their mass to charge ratios before they are detected by a detector, includes:

a device for measuring lengths of time of flight of ions in at least two states in which an effective distance from the ion source to an entrance of the round orbit or the reciprocal path is different; and a data processor for calculating or estimating a mass to charge ratio of an ion based on a difference of the lengths of time of flight of ions of the same mass to charge ratio.

Similarly to the first mode of the present invention, the mass to charge ratio of an ion can be determined by first measuring the lengths of the flight time in the two states having different effective distances, and then calculating the difference in the time lengths. The ion source may be one that generates ions within itself and accelerate them, or it may be one to which ions are supplied from outside and in which the ions are accelerated.

The several types of the TOF-MS of the first mode for differentiating the effective distance can be similarly applicable to the second mode. That is, in order to change the effective distance: the position of a single ion source is changed; plural ion sources are provided and at least two of them are used; ion reflecting electrodes are provided between the ion source and the entrance of the round orbit or the reciprocal path, and the voltage applied to the ion reflecting electrodes are changed; or an electrostatic analyzer is provided between the ion source and the entrance of the round orbit or the reciprocal path, and the voltage applied to the electrostatic analyzer are changed.

In the first mode and second mode of the present invention described above, the effective distance between the ion source and the entrance of the round orbit or the reciprocal path or between the exit of the round orbit or the reciprocal path and the detector is changed For the purpose of changing the flight time of the same ions, other measures can be taken: the force applied to the flying ions may be changed.

In the third mode of the present invention, therefore, a TOF-MS in which ions generated by an ion source fly a round orbit or a reciprocal path once or more than once to be separated by their mass to charge ratios before they are detected by a detector, includes:

acceleration/deceleration electrodes placed between the ion source and an entrance of the round orbit or the reciprocal path or between an exit of the round orbit or the reciprocal path and the detector for forming an electric field to accelerate or decelerate the ions passing therethrough;

a device for measuring the lengths of time of flight of ions of the same mass to charge ratio in at least two states in which voltages applied to the acceleration/deceleration electrodes are different; and a data processor for calculating or estimating a mass to charge ratio of an ion based on a difference of the lengths of time of flight of ions of the same mass to charge ratio.

According to the TOF-MS of the present invention inclusive of the first to the third modes, by conducting only two measurements on the same sample, ions of a wide range of mass to charge ratios can be analyzed. This enhances the efficiency of a mass analysis of a sample. When the amount of available sample is very small, the TOF-MS of the present invention can make its mass analysis in a wide range of mass to charge ratios, wherein conventional TOF-MS was difficult to achieve.

BRIEF DESCRIPTION OF THE DRAWINGS

FIGS. 7A and 7B are graphs of ion intensity vs. time of flight for explaining the principle of the TOF-MS of the present invention.

FIG. 8 is a graph of number of turns vs. mass to charge ratio of ions for explaining the principle of the TOF-MS of the present invention.

DETAILED DESCRIPTION OF PREFERRED EMBODIMENTS

Figure 1:
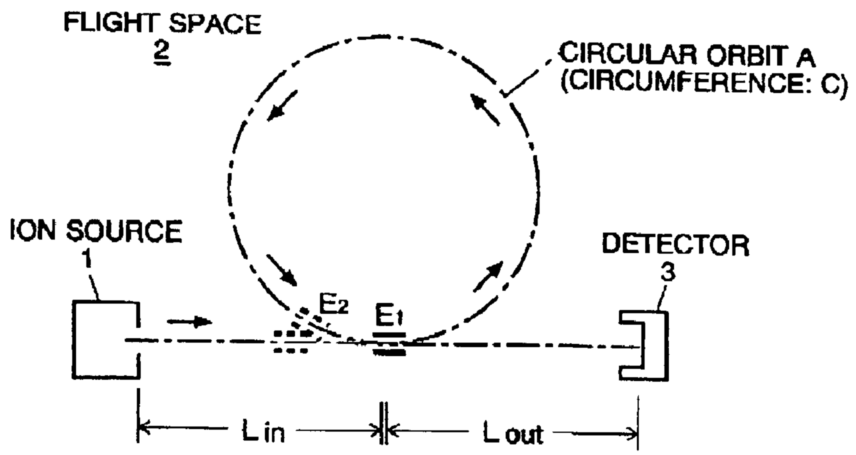
FIG. 1 is an illustration of a circular orbit of a TOF-MS for explaining the principle of the present invention.

In the TOF-MS of FIG. 1, various ions drawn out of the ion source 1 are introduced into the flight space 2, and are put on the circular orbit A. The ions run on the orbit A one or more turns, and leave the fight space 2, whereby they are detected by the detector 3. Such movement of the ions can be controlled by maneuvering the voltage applied to electrodes placed at or near the cross point of the round orbit A and the leading path to it as shown by $E_1$ or $E_2$ in FIG. 1. Various known type of ion sources can be used as the ion source 1, such as an ion trap device and an ion source using the Matrix-Assisted Laser Desorption Ionization (MALDI) method.

The variables in FIG. 1 are defined as follows.

$L_{in}$: The distance between the ion source 1 and the entrance of the circular orbit A (hereinafter referred to as "entrance flight distance")

$L_{out}$: The distance between the exit of the circular orbit A and the detector 3 (hereinafter referred to as "exit flight distance")

U: The kinetic energy of an ion.

C(U): The circumference length of the circular orbit A in the flight space 2 (hereinafter referred to as "orbit length")

m: The mass to charge ratio of an ion.

TOF(m,U): The time for an ion having mass to charge ratio m and kinetic energy U to fly from the ion source 1 to the detector 3.

V(m,U): The speed of an ion having mass to charge ratio m and kinetic energy U.

N(m): The number of turns an ion having mass to charge ratio m runs on the circular orbit A It is supposed here that ions have an equal kinetic energy U irrespective of their mass m.

From the principles of the TOF-MS, the following equation (1) is apparent.

$$TOF(m,U)\times V(m,U)=L_{in}+N(m)\times C(U)+L_{out} \quad (1)$$

If $L_{out}$ is changeable, and can take the values of $L_{out1}$ and $L_{out2}$ (where $L_{out1}<L_{out2}$), the values of TOF(m,U), $TOF_1$(m,U) and $TOF_2$(m,U), of the respective cases are as follows.

$$TOF_1(m,U)\times V(m,U)=L_{in}+N(m)\times C(U)+L_{out1} \quad (2)$$

$$TOF_2(m,U)\times V(m,U)=L_{in}+N(m)\times C(U)+L_{out2} \quad (3)$$

Taking the difference of equations (2) and (3), $$V(m,U)\times\{TOF_1(m,U)-TOF_2(m,U)\}=L_{out1}-L_{out2},$$

which can be rewritten as $$\Delta TOF=TOF_1(m,U)-TOF_2(m,U)=(L_{out1}-L_{out2})/V(m,U) \quad (4)$$

Since the speed V(m,U) of an ion depends on the mass to charge ratio m, equation (4) indicates that the difference ΔTOF of flight time depends on the mass to charge ratio m. This means that by measuring the difference ΔTOF of the same ion, its mass to charge ratio m can be obtained.

The TOF-MS of the first mode of the present invention obtains the information of mass to charge ratio m of an ion using the difference of time of night when the exit distance $L_{out}$ is changed. The exit distance $L_{out}$ can be changed in many ways, some of which are described in the following embodiments (first to fifth embodiments) referring to FIGS. 2–6.

In the above explanation, the two states have different exit distances $L_{out}$. The idea can be applied similarly to the distance between the ion source and the entrance of the round orbit or the reciprocal path (which will be referred to as the "entrance distance") $L_{in}$. By providing two states having different effective entrance distances $L_{in1}$ and $L_{in2}$, the mass to charge ratio m can be determined regarding the difference in the lengths of flight time in the two states. This idea corresponds to the second mode of the present invention, and some embodiments (sixth to tenth embodiments) of the second mode are illustrated in FIGS. 9–13, which respectively correspond to FIGS. 2–6.

[Embodiment 1]

Figure 2:
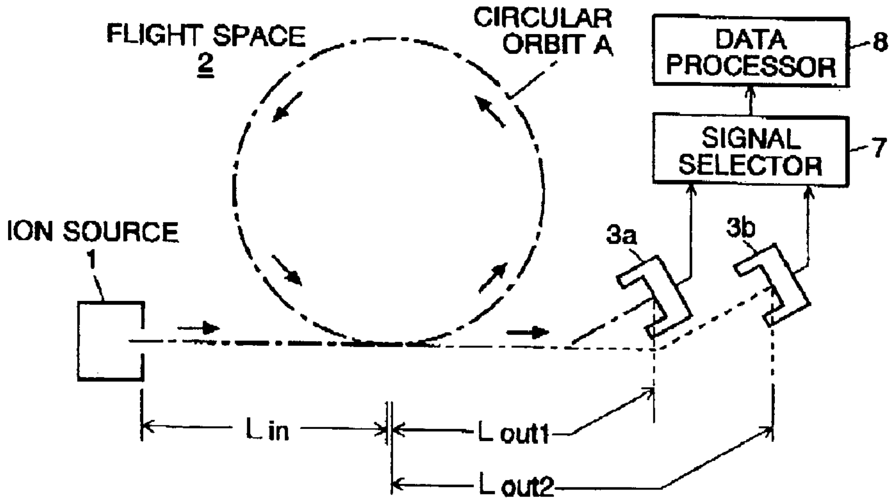
FIG. 2 is a schematic structure of a TOF-MS of an embodiment (first embodiment) of the first mode of the present invention.

FIG. 2 shows Embodiment 1, in which two detectors 3*a* and 3*b* are provided, and the first and second detectors 3*a* and 3*b* are placed with different exit distances $L_{out1}$ and $L_{out2}$. The paths to the two detectors 3*a* and 3*b* are deflected differently (by using appropriate electric fields, for example) so that respective detectors can receive ions. The shapes of the paths are arbitrary if they can convey ions to respective detectors 3*a* and 3*b* selectively.

The operation is as follows. First, it is set to lead ions from the flight space 2 to the first detector 3*a*, and the signal selector 7 is set to select a signal from the first detector 3*a* Then a TOF-MS measurement of a sample is conducted, and the data processor 8 processes data coming from the first detector 3*a*. The data processor 8 produces a graph of $TOF_1$ vs. intensity of ions received as shown in FIG. 7A, Secondly, it is set to lead ions from the flight space 2 to the second detector 3*b*, and the signal selector 7 is set to select a signal from the second detector 3*b*. Then another TOF-MS measurement of the same sample is conducted, and the data processor 8 processes data coming from the second detector 3*b*. The data processor 8 produces a graph of $TOF_2$ vs. intensity of ions received as shown in FIG. 7B.

Since the two measurements are made on the same sample, the intensities of the same ions are almost the same between the graphs of FIG. 7A and FIG. 7B. By comparing the peaks of the two graphs, pairs of corresponding peaks can be found, and the values of $TOF_1$ and $TOF_2$ can be determined from the pairs of pea. Since the exit distances $L_{out1}$ and $L_{out2}$ are known, the data processor 8 calculates the speed V(m,U) of an object ion using the equation (4) and the values of ΔTOF which is the difference between $TOF_1$ and $TOF_2$. Then the mass to charge ratio m of the object ion is calculated from the speed V(m,U).

The mass to charge ratio m of an object ion can be thus calculated, in principle, from the difference ΔTOF, but the accuracy of the calculated mass to charge ratio m depends on the difference in the exit distances $L_{out1}$ and $L_{out2}$. In such an apparatus, it is difficult to secure a large difference of the exit distances $L_{out1}$ and $L_{out2}$, and to enhance the accuracy of mass to charge ratio m. According to the present invention, instead of using the difference ΔTOF to obtain the accurate value of mass to charge ratio m of an object ion, the difference ΔTOF can be used to roughly estimate the mass to charge ratio m, whereby the range of the mass to charge ratios to be measured can be restricted.

In the mass spectrometer having a round orbit as described above, the relationship between the mass to charge ratio m of ions and the number of turns N(m) is shaped like steps as shown in FIG. 8. The mass to charge ratios m corresponding to the same number of turns N, which belong to one step of the graph of FIG. 8, can be calculated with great accuracy from a flight time and number of turns N by one of the detectors (first detector 3*a* or second detector 3*b*). But it is difficult to determine whether the ions detected by one of the detectors have the same number of turns N (i.e., belong to the same step of the graph of FIG. 8), or they have different number of turns $N_1$ and $N_2$ (i.e., belong to adjacent steps). In the TOF-MS of the present embodiment, ions can be roughly separated into different mass to charge ratio ranges from the flight time difference ΔTOF of the two detectors. After that, within each mass to use ratio range, the mass to charge ratios of ions can be precisely determined from a fight time obtained in one of the detectors. Thus the data processor 8 can precisely determine the mass to charge ratios of ions for a wide range of mass to charge ratios by making only two measurements on the same sample

[Embodiment 2]

Figure 3:
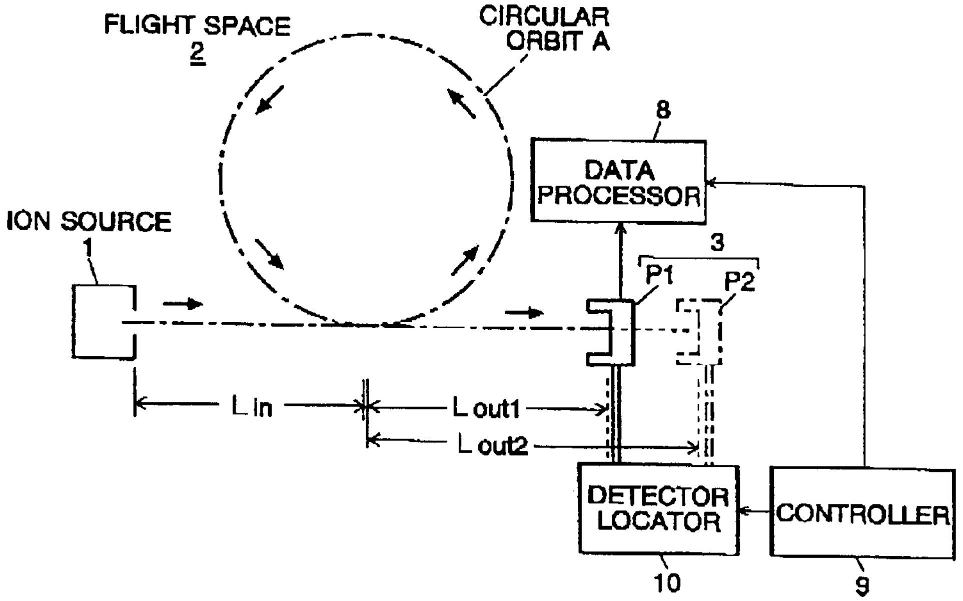
FIG. 3 is a schematic structure of a TOF-MS of an embodiment (second embodiment) of the first mode of the present invention.

FIG. 3 shows a schematic structure of the TOF-MS as the second embodiment of the present invention. As shown in FIG. 2, the TOF-MS of the first embodiment needed two detectors, while the TOF-MS of the present embodiment requires only one detector. In the present TOF-MS, the controller 9 controls the detector locator 10 to place the detector 3 at either the fist position $P_1$ or the second position $P_2$. Thus two measurement can be made with different exit distances $L_{out1}$ and $L_{out2}$.

[Embodiment 3]

Figure 4:
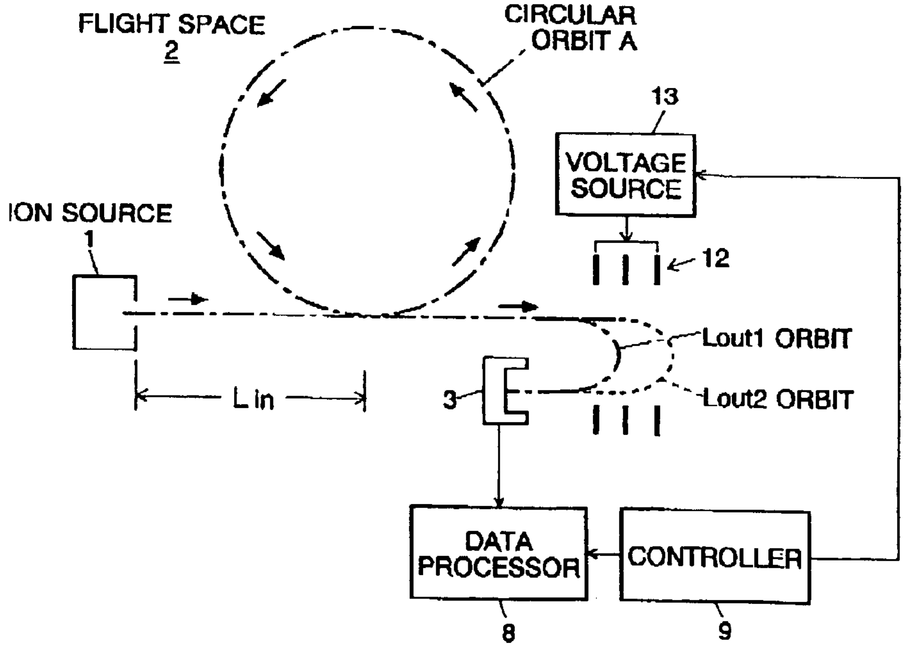
FIG. 4 is a schematic structure of a TOF-MS of an embodiment (third embodiment) of the first mode of the present invention.

FIG. 4 shows a schematic structure of the TOF-MS as the third embodiment of the present invention. In the present embodiment, an ion reflector 12 is provided after the exit of the flight space 2, so that ions coming out of the flight space 2 is turned back before they enter the detector 3. By controlling the voltage generator 13 and changing the voltage gradient produced in the ion reflector 12, the depth of turn-back of ions is changed as shown in FIG. 4, so that two different exit distances $L_{out1}$ and $L_{out2}$ can be realized,

[Embodiment 4]

Figure 5:
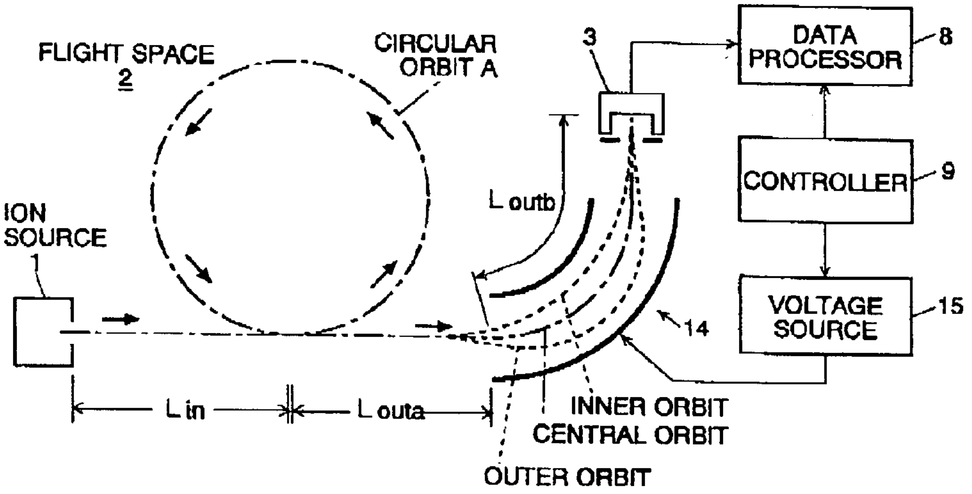
FIG. 5 is a schematic structure of a TOF-MS of an embodiment (fourth embodiment) of the first mode of the present invention.

FIG. 5 shows a schematic structure of the TOF-MS as the fourth embodiment of the present invention. In the present embodiment, an electrostatic analyzer 14 is provided between the exit of the night space 2 and the detector 3. The electrostatic analyzer 14 includes a pair of fan-shaped electrodes between which ions pass. By changing the voltage applied to the pair of electrodes from the voltage generator 15, the electrostatic field in the analyzer 14 is changed and the flight path of the same ion is changed, as shown in FIG. 5. When ions of various mass to charge ratios come into the electrostatic analyzer 14, the mass to charge ratio of ions running on the central course is changed by changing the voltage to the electrodes of the analyzer 14. In FIG. 5, the distances $L_{outa}$ and $L_{outb}$ are defined as follows.

$L_{outa}$: The distance hum the exit of the circular orbit A to the entrance of the electrostatic analyzer 14.

$L_{outb}$: The distance form the entrance of the electrostatic analyzer 14 to the detector 3 (on the central course in the analyzer 14).

Other variables $L_{in}$, C(U), U, m, TOF(m,U), V(m,U), N(m) are as defined before.

From the principles of the TOF-MS, the following equation (5) is apparent.

$$V(m,U)=(2U/m)^{1/2} \quad (5)$$

$$TOF(m,U)\times V(m,U)=L_{in}+N(m)\times C(U)+L_{outa}+L_{outb} \quad (6)$$

Let us define tile time needed for an ion to fly the distance $L_{outb}$ as $T_{loutb}$. The kinetic energy of ions U has a certain variation, wherein the voltage applied to the electrostatic analyzer 14 is normally set so that ions having the kinetic energy U at the central value pass the central course. If the voltage applied to the electrostatic analyzer 14 is changed so that the kinetic energy of ions passing the central course is changed from U to U', the following is the case.

$$T_{loutb}=L_{outb}/V(m,U')$$

In this case, ions having kinetic energy U do not pass the central course but go to an inner or outer course, as shown in FIG. 5. If the ions pass the inner course or the outer course, the distance $L_{outb}$ is different from the case where they pass the central course. This means that, by changing the voltage applied to the electrodes of the electrostatic analyzer 14, the exit distance can be changed.

The difference ΔTOF(m) of the flight time in the electrostatic analyzer 14 is calculated as $$\Delta TOF(m)=L_{outb}(V\times(m,U)^{-1}-V\times(m,U')^{-1}) \quad (7)$$

Equation (7) shows that the difference of the flight time depends on the mass to charge ratio of ions. Using equations (5), (6) and (7), the mass to charge ratio m can be calculated as $$m=2\times\Delta TOF(m)^2\times(U'^{-1/2}-U^{-1/2})^{-2}/L_{outb}^{2}, \quad (8)$$

which means that the mass to charge ratio m of an ion can be determined by measuring the fight time difference if U, U' and $L_{outb}$ are known.

As seen by comparing equations (4) and (7), it is necessary to know the kinetic energies U and U' of ions passing through the central course to calculate the mass to charge ratio m of the ions in the present embodiment. This is because the actual flight distances on the outer course and the inner course in the electrostatic analyzer 14 are unknown. If these flight distances can be obtained through some measures (mechanics calculations, for example), the flight distances, instead of the energies U and U', can be used as the parameters.

[Embodiment 5]

Figure 6:
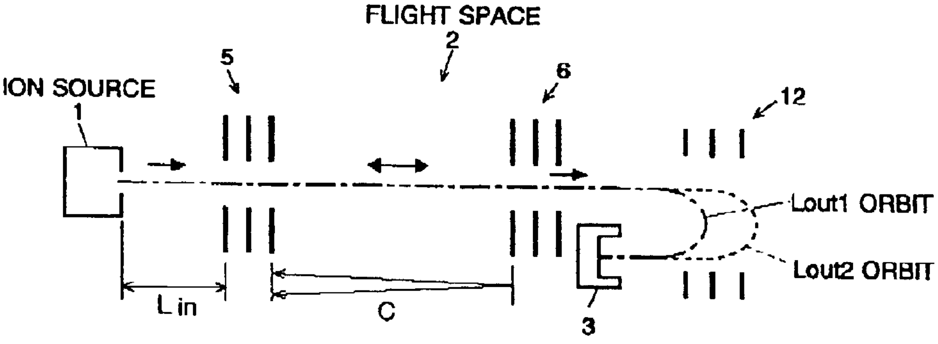
FIG. 6 is a schematic structure of a TOF-MS of an embodiment (fifth embodiment) of the first mode of the present invention.

In the preceding examples, ions go round on a circular orbit in the flight space 2. It is of course apparent that the present invention is not limited to TOF-MSs having such a circular orbit but to those having any other orbit that the ions run more than once. FIG. 6 shows a schematic structure of the TOF-MS as the fifth embodiment of the present invention.

The flight space 2 of the present embodiment provides a linear path which is defined between the entrance electrodes 5 and the exit electrodes 6. Ions coming from the entrance electrodes 5 run on the linear path reciprocally plural times, wherein the round-trip distance of the linear path corresponds to the circumference C(U) of the circular orbit A. Ions ejected from the ion source 1 enter the flight space 2 through the entrance electrodes 5, move forward and backward more than once between the entrance electrodes 5 and the exit electrodes 6, and finally leave the flight space 2 through the exit electrodes 6 to be detected by the detector 3. Such movements of ions can be achieved by controlling the voltages to the entrance electrodes 5, exit elects 6 and other electrodes, if necessary.

In the case of circular orbit A (or generally a go-around orbit), the entering point to the orbit and the exit point of the orbit are almost the same. But in the case of the linear path as-shown in FIG. 6, the entering point to the path and the exit point are distant by a half of the round-trip distance. Thus, after flying a plurality of round-trip distances, ions must fly an additional half the round-trip distance before they exit the flight space 2. In this case, equation (1) is replaced by the following equation (10), but other equations can be used without any change to calculate the mass to charge ratio of the object ions.

$$TOF(m,U)\times V(m,U)=L_{in}+(N(m)+1/2)\times C(U)+L_{out} \quad (10)$$

[Embodiment 6]

Figure 9:
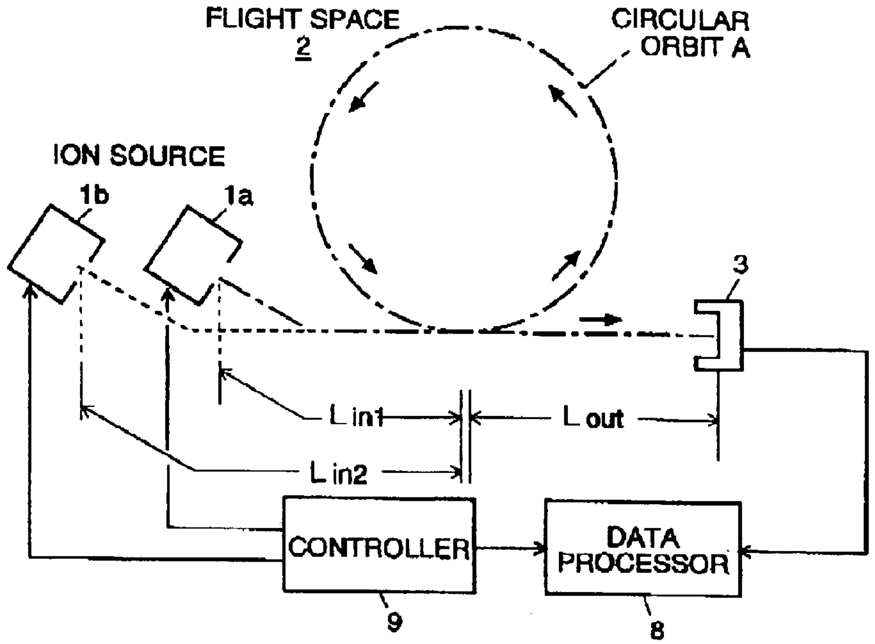
FIG. 9 is a schematic structure of a TOF-MS of an embodiment (sixth embodiment) of the second mode of the present invention.

FIG. 9 shows a TOF-MS of the sixth embodiment, which corresponds to that of the first embodiment shown in FIG. 2. In the present embodiment, two ion sources 1$a$ and 1$b$ are provided, and the entrance distance $L_{in}$ is changed by using the two ion sources 1$a$ and 1$b$.

[Embodiment 7]

Figure 10:
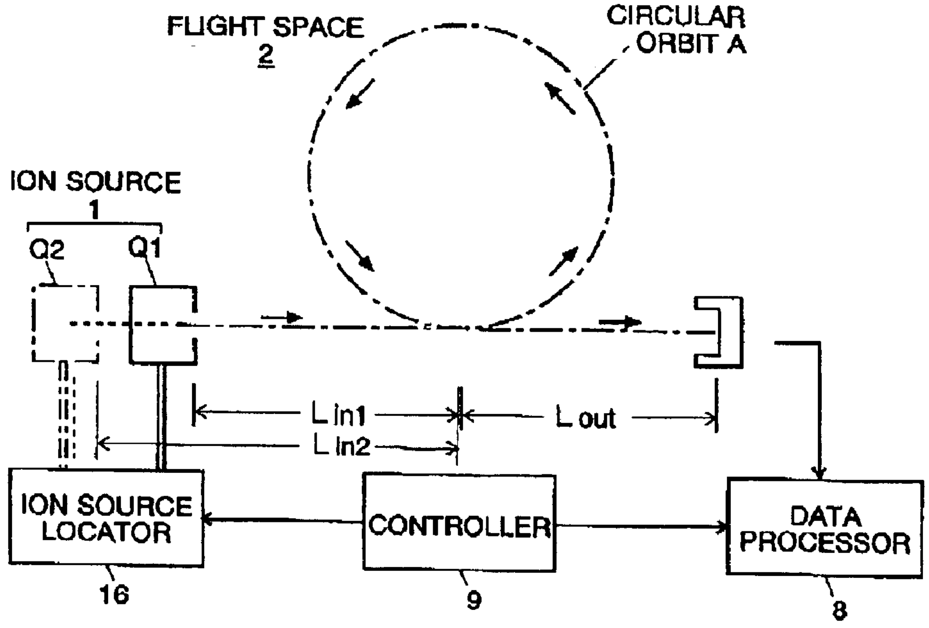
FIG. 10 is a schematic structure of a TOF-MS of an embodiment (seventh embodiment) of the second mode of the present invention.

FIG. 10 shows a TOF-MS of the seventh embodiment, which corresponds to that of the second embodiment shown in FIG. 3. In the present embodiment, an ion source locator 16 is provided, which moves the sole ion source 1 to change the entrance distance $L_{in}$.

[Embodiment 8]

Figure 11:
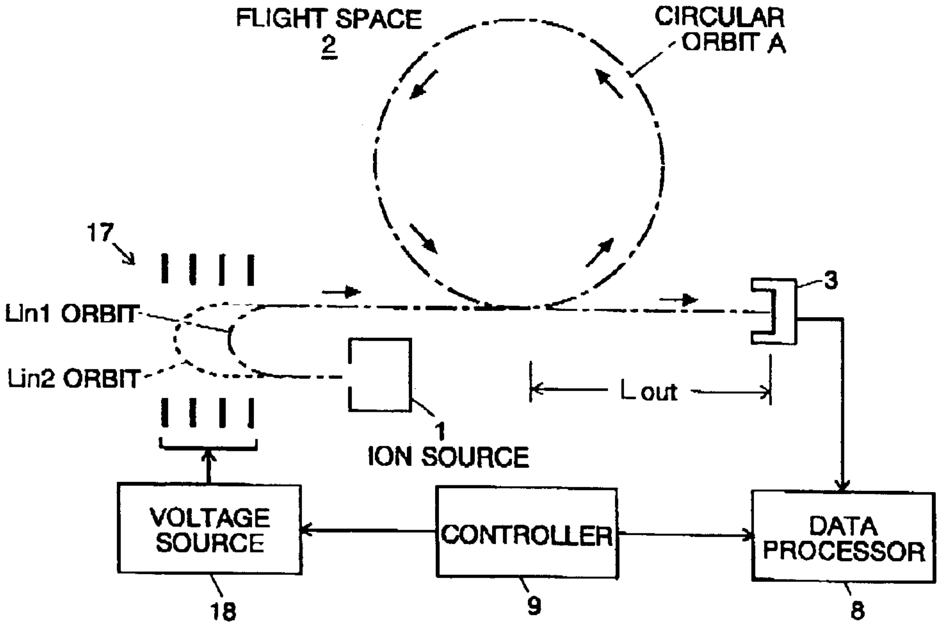
FIG. 11 is a schematic structure of a TOF-MS of an embodiment (eighth embodiment) of the second mode of the present invention.

FIG. 11 shows a TOF-MS of the eighth embodiment, which corresponds to that of the third embodiment shown in FIG. 4. In the present embodiment, ion reflecting electrodes 17 are provided. Ions generated and ejected from the ion source 1 are reflected by the ion reflecting electrodes 17 and enter the flight space 2. By changing the voltage applied to the ion reflecting electrodes 17, the enter distance $L_{in}$ changes.

[Embodiment 9]

Figure 12:
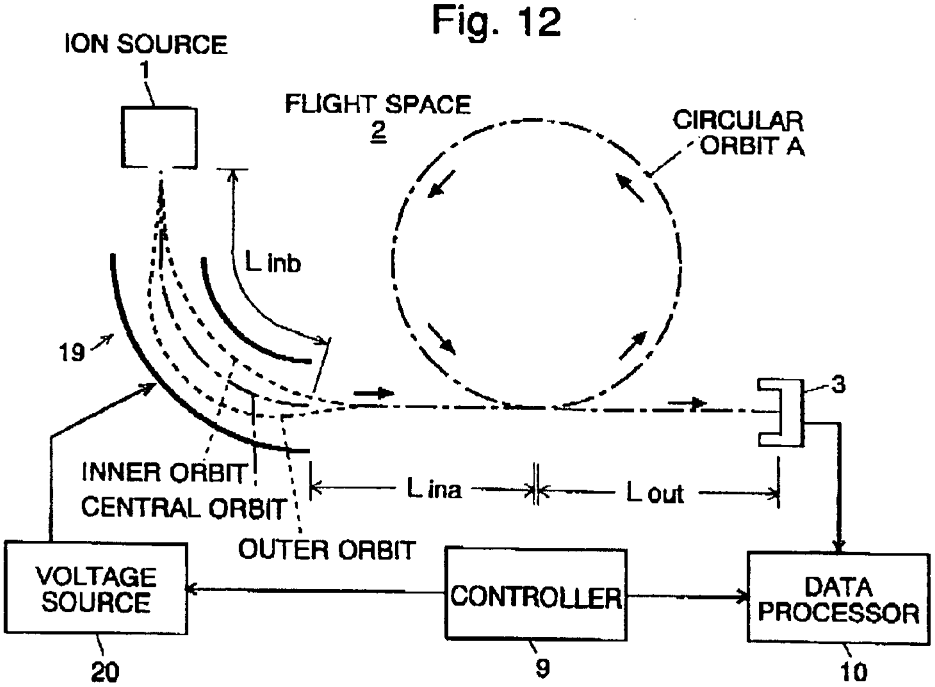
FIG. 12 is a schematic structure of a TOF-MS of an embodiment (ninth embodiment) of the second mode of the present invention.

FIG. 12 shows a TOF-MS of the ninth embodiment, which corresponds to that of the fourth embodiment shown in FIG. 5. In the present embodiment, an electrostatic analyzer 19 is provided, which deflects ions generated and ejected from the ion souse 1 toward the night space 2. By changing the voltage applied to the electrostatic analyzer 19, the entrance distance $L_{in}$ changes.

[Embodiment 10]

Figure 13:
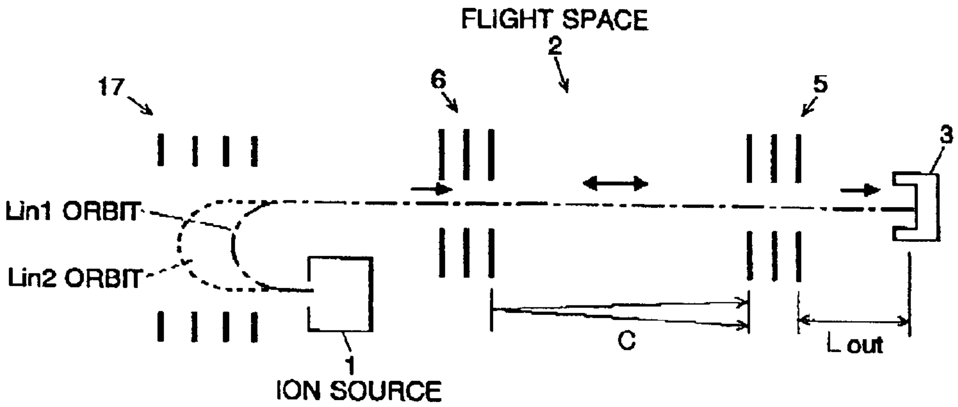
FIG. 13 is a schematic structure of a TOF-MS of an embodiment (tenth embodiment) of the second mode of the present invention.

FIG. 13 shows a TOF-MS of the tenth embodiment, which corresponds to that of the fifth embodiment shown in FIG. 6. In the present embodiment, ions run on a reciprocal path to and from more than once as in the fifth embodiment. Ion reflecting electrodes 17 are provided, so that ions generated and ejected from the ion source 1 are reflected by the ion reflecting electrodes 17 and enter the flight space 2. By changing the voltage applied to the ion reflecting electrodes 17, the entrance distance $L_{in}$ changes.

[Embodiment 11]

Figure 14:
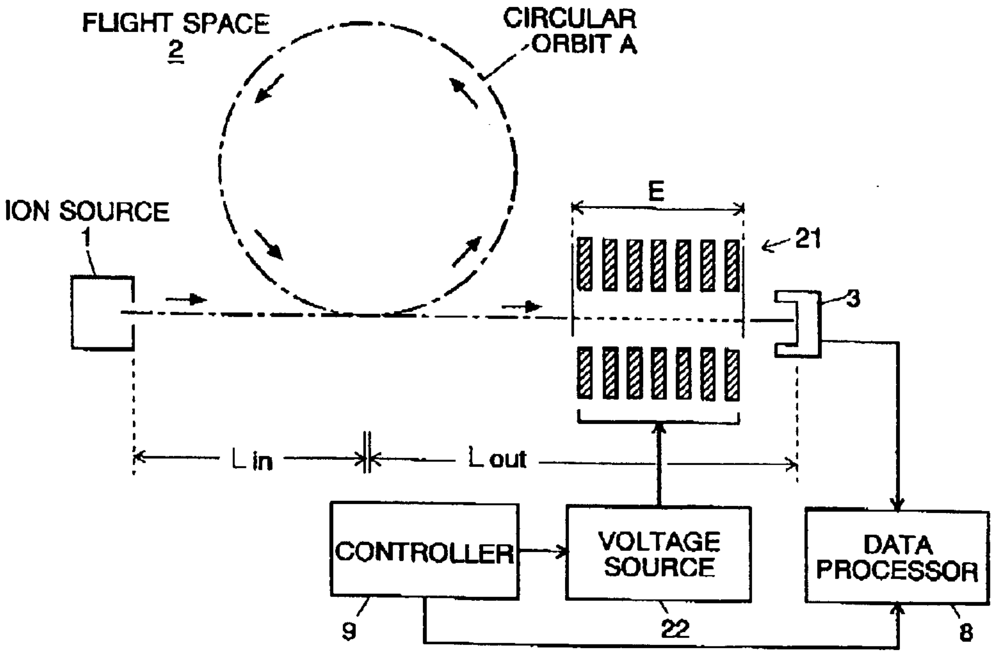
FIG. 14 is a schematic structure of a TOF-MS of an embodiment (eleventh embodiment) of the third mode of the present invention.
Figure 15:
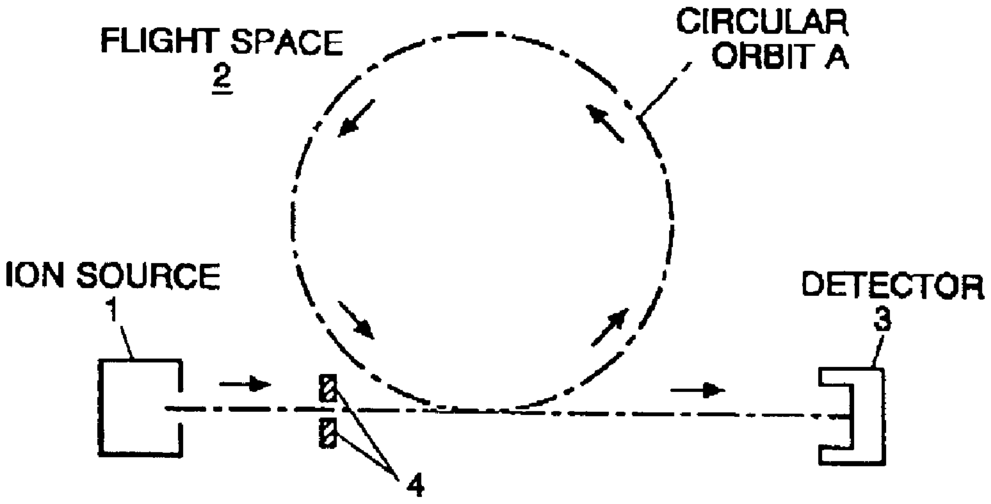
FIG. 15 is a schematic structure of a general TOF-MS having a round orbit in the flight space.

In the preceding fist to tenth embodiments, the effective distance in the entrance side or in the exit side of the round orbit or the reciprocal path for ions of the same mass to charge ratio is changed. Instead of changing the effective distance, the same result can be obtained by changing an accelerating force or a decelerating force applied to the ions of the same mass to charge ratio flying outside of the round orbit or the reciprocal path, i.e., between the ion source and the entrance of the round orbit or the reciprocal path, or between the exit of the round orbit or the reciprocal path and the detector. The third mode of the present invention adopts the idea An embodiment of the third mode (eleventh embodiment) is illustrated in FIG. 14.

In the present embodiment, decelerating electrodes 21 are provided on the ion path at the exit side, and the decelerating force applied to the ions passing through the electric field space E is changed by changing the voltage applied to the decelerating electrodes 21 from the voltage source 22. In this case, the exit distance $L_{out}$ does not change but the length of tie for the ions to pass through the electric field space E changes. This has the same effect as the above embodiments because the flight time of ions from the ion source 1 to the detector 3 changes, and the mass to charge ratio of the ions can be estimated based on the difference of the flight time.

Although only some exemplary embodiments of this invention have been described in detail above, those skilled in the art will readily appreciated that many modifications are possible in the exemplary embodiments without materially departing from the innovative teachings and advantages of this invention. Accordingly, all such modifications are intended to be included within the scope of this invention.

What is claimed is:

1. A TOF-MS in which ions fly a round orbit or a reciprocal path once or more than once to be separated by their mass to charge ratios before they are detected by a detector, comprising:

means for measuring lengths of time of flight of ions in at least two states in which an effective distance from an exit of the round orbit or the reciprocal path to the detector is different; and means for calculating or estimating a mass to charge ratio of an ion based on a difference of the lengths of time of flight of ions of the same mass to charge ratio.

2. The TOF-MS according to claim 1, wherein said at least two states are realized by changing a position of a detector.

3. The TOF-MS according to claim 1, wherein said at least two states are realized by providing separate detectors.

4. The TOF-MS according to claim 1, wherein said at least two states are realized by changing a voltage applied to an ion reflecting electrodes for reflecting ions after leaving the round orbit or the reciprocal path and before entering the detector.

5. The TOF-MS according to claim 1, wherein said at least two states are realized by changing a voltage applied to an electrostatic analyzer for deflecting a course of ions after leaving the round orbit or the reciprocal path and before entering the detector.

6. A TOF-MS in which ions generated by an ion source fly a round orbit or a reciprocal path once or more than once to be separated by their mass to charge ratios before they are detected by a detector, comprising:

means for measuring lengths of time of flight of ions in at least two states in which an effective distance from the ion source to an entrance of the round orbit or the reciprocal path is different; and means for calculating or estimating a mass to charge ratio of an ion based on a difference of the lengths of time of flight of ions of the same mass to charge ratio.

7. The TOF-MS according to claim 6, wherein said at least two states are realized by changing a position of an ion source.

8. The TOF-MS according to claim 6, wherein said at least two states are realized by providing separate ion sources.

9. The TOF-MS according to claim 6, wherein said at least two states are realized by changing a voltage applied to ion reflecting electrodes for reflecting ions after leaving the ion source and before entering the round orbit or the reciprocal path.

10. The TOF-MS according to claim 6, wherein said at least two states are realized by changing a voltage applied to an electrostatic analyzer for deflecting a course of ions after leaving the ion source and before entering the round orbit or the reciprocal path.

11. A TOF-MS in which ions generated by an ion source fly a round orbit or a reciprocal path once or more than once to be separated by their mass to charge ratios before they are detected by a detector, comprising:

acceleration/deceleration electrodes placed between the ion source and an entrance of the round orbit or the reciprocal path or between an exit of the round orbit or the reciprocal path and the detector for forming an electric field to accelerate or decelerate the ions passing therethrough;

means for measuring lengths of time of flight of ions of the same mass to charge ratio in at least two states in which voltages applied to the acceleration/deceleration electrodes are different; and means for calculating or estimating a mass to charge ratio of an ion based on a difference of the lengths of time of flight of ions of the same mass to charge ratio.

12. A method of measuring mass to charge ratios of ions in a TOF-MS in which ions fly a round orbit or a reciprocal path once or more than once to be separated by their mass to charge ratios before they are detected by a detector, the method comprising steps of:

measuring lengths of time of flight of ions in at least two states in which an effective distance from an exit of the round orbit or the reciprocal path to the detector is different; and calculating or estimating a mass to charge ratio of an ion based on a difference of the lengths of time of flight of ions of the same mass to charge ratio.

13. The method according to claim 12, wherein said at least two states are realized by changing a position of the detector.

14. The method according to claim 12, wherein said at least two states are realized by providing separate detectors.

15. The method according to claim 12, wherein said at least two states are realized by changing a voltage applied to an ion reflecting electrodes for reflecting ions after leaving the round orbit or the reciprocal path and before entering the detector.

16. The method according to claim 12, wherein said at least two states are realized by changing a voltage applied to an electrostatic analyzer for deflecting a course of ions after leaving the round orbit or the reciprocal path and before entering the detector.

17. A method of measuring mass to charge ratios of ions in a TOF-MS in which ions generated by an ion source fly a round orbit or a reciprocal path once or more than once to be separated by their mass to charge ratios before they are detected by a detector, the method comprising steps of:

measuring lengths of time of flight of ions in at least two states in which an effective distance from the ion source to an entrance of the round orbit or the reciprocal path is different; and calculating or estimating a mass to charge ratio of an ion based on a difference of the lengths of time of flight of ions of the same mass to charge ratio.

18. The method according to claim 17, wherein said at least two states are realized by changing a position of an ion source.

19. The method according to claim 17, wherein said at least two states are realized by providing separate ion sources.

20. The method according to claim 17, wherein said at least two states are realized by changing a voltage applied to ion reflecting electrodes for reflecting ions after leaving the ion source and before entering the round orbit or the reciprocal path.

21. The method according to claim 17, wherein said at least two states are realized by changing a voltage applied to an electrostatic analyzer for deflecting a course of ions after leaving the ion source and before entering the round orbit or the reciprocal path.

22. A method of measuring mass to charge ratios of ions in a TOF-MS in which ions generated by an ion source fly a round orbit or a reciprocal path once or more than once to be separated by their mass to charge ratios before they are detected by a detector, the method comprising steps of:

forming an electric field with acceleration/deceleration electrodes placed between the ion source and an entrance of the round orbit or the reciprocal path or between an exit of the round orbit or the reciprocal path and the detector to accelerate or decelerate the ions passing therethrough;

measuring lengths of time of flight of ions of the same mass to charge ratio in at least two states in which voltages applied to the acceleration/deceleration electrodes are different; and calculating or estimating a mass to charge ratio of an ion based on a difference of the lengths of time of flight of ions of the same mass to charge ratio.

* * * * *